United States Patent [19]

Mason

[11] E Re. 28,768

[45] Reissued Apr. 13, 1976

[54] JARRING AND BUMPING TOOL FOR USE IN OILFIELD DRILLING STRINGS

[75] Inventor: Leonard Mason, Edmonton, Canada

[73] Assignee: Lee-Mason Tools Ltd., Edmonton, Canada

[22] Filed: Dec. 30, 1974

[21] Appl. No.: 537,573

Related U.S. Patent Documents

Reissue of:

[64] Patent No.: 3,804,185
Issued: Apr. 16, 1974
Appl. No.: 171,063
Filed: Aug. 12, 1971

[52] U.S. Cl. ..... 175/297; 166/178
[51] Int. Cl.[2] ..... E21B 1/10
[58] Field of Search ..... 166/178; 173/90, 91; 175/297; 294/86.18

[56] References Cited

UNITED STATES PATENTS

| | | | |
|---|---|---|---|
| 2,721,056 | 10/1955 | Storm | 175/297 |
| 3,405,773 | 10/1968 | Sutliff et al. | 175/297 |
| 3,716,109 | 2/1973 | Griffith | 166/178 |
| 3,729,058 | 4/1973 | Roberts | 175/297 |

*Primary Examiner*—Ernest R. Purser
*Assistant Examiner*—Jack E. Ebel
*Attorney, Agent, or Firm*—Millen, Raptes & White

[57] ABSTRACT

A single tool, having a bumper free-stroke chamber and jar free-stroke chamber spaced apart by the usual reduced-diameter barrel section, is provided. The tool carries impact faces and is adapted to selectively jar upwardly or bump downwardly.

23 Claims, 16 Drawing Figures

JARRING AND BUMPING TOOL FOR USE IN OILFIELD DRILLING STRINGS

Matter enclosed in heavy brackets [ ] appears in the original patent but forms no part of this reissue specification; matter printed in italics indicates the additions made by reissue.

BACKGROUND OF THE INVENTION

This invention relates to a hydraulic tool for use in a drill string, such as is used in the drilling of oil and gas wells. More particularly, it relates to a tool adapted to jar upwards or bump downwards for the purpose of freeing the drill string when it is stuck.

A drill string is normally comprised of several components. At the bottom of the string is the bit which, by way of illustration, may have an outside diameter of 8 ¾ inches. Above the bit is a series of tubular drill collars which provide drilling weight to the string. These collars might have an outside diameter of 6 ¾ inches. Finally, a series of joints of drill pipe extend from the drill collars to the drilling rig at ground surface. The drill pipe commonly has an outside diameter of 4 ½ inches.

In some drilling operations, the drill string periodically becomes lodged in the well bore. As would be expected, it is usually the large diameter components which become stuck.

When this occurs, one of the techniques used to try to free the string involves delivering repeated upward jars or downward bumps to the stuck section. Under most circumstances, it is desirable to deliver impacts is only one direction with the tool. For example, in the case where the drill collars are pulled into a keyseat, one should only bump the collars downward to free them. To jar them upward would simply wedge them into the keyseat tighter than ever. On the other hand, when the bit gets trapped on bottom by sloughing shale, one only wishes to jar upwards.

In the past, separate tools have been used in the drilling string to effect bumping or jarring. These tools are usually positioned part way down in the string amongst the drill collars but above the stabilizers.

The first such tool, referred to as a bumper sub, comprises a tubular outer barrel slidably receiving a tubular inner mandrel. The mandrel connects at its upper end to the drill pipe and the barrel connects at its lower end to the drill collars. The mandrel carries a hammer element at its bottom end and the ends of the barrel are closed with suitable shoulders which limit the longitudinal movement of the mandrel. Mechanical locking means, such as a spline joint, is included in the tool to permit relative longitudinal movement of the mandrel and barrel but prevent relative rotational movement. To use the tool, the drill pipe is raised by the rig until the mandrel hammer contacts the upper shoulder of the barrel. The drill pipe is then dropped; the mandrel hammer smashes into the bottom shoulder of the barrel and transmits a terrific jolt to the drill collars beneath. This procedure is repeated as often as required. It is to be noted that the bumper sub operates on the principle of free fall of the drill pipe.

The second tool, termed a hydraulic jar, also comprises a telescoping inner mandrel and outer barrel. The mandrel is usually connected at its upper end to the drill pipe portion of the string. The barrel is connected at its lower end to the drill collar portion. The mandrel and barrel define an annular space between them. This space is closed at its ends by packing and a body of operating oil is retained within the space. The barrel wall is formed at its bottom end with a section of reduced interior diameter. The mandrel carries a sleeve-type valve which is positioned in the reduced diameter section when the tool is collapsed. When the drill pipe is raised, the mandrel valve is drawn upward through the reduced diameter section toward a large diameter of "free-stroke" chamber defined by the barrel wall. As this movement takes place, the oil trapped within the free-stroke chamber is compressed and pressurized to pressures in the order of 5,000 to 10,000 p.s.i. Oil leaks slowly from the free-stroke chamber to the reduced-diameter chamber through the narrow annular space defined between the valve and reduced-diameter section wall. The annular space is designed to permit the oil to leak through at a rate whereby the pressure within the free-stroke chamber is maintained at 5,000 to 10,000 p.s.i. This arrangement results in retardation of the relative longitudinal movement of the mandrel and barrel. The driller is able to use the rig to pull the drill pipe with a force of about 50,000 to 100,000 pounds over its weight (the free-stroke chamber usually has a cross sectional area in the order of 10 square inches so that a pressure therein of 5,000 to 10,000 p.s.i. provides a resistance in the order of 50,000 to 100,000 pounds). When this is done, the pipe stretches and in so doing stores a considerable amount of elastic energy. As the valve moves out of the reduced diameter section, the elastic energy stored in the drill pipe accelerates the mandrel upward and a hammer shoulder it carries slams into an anvil shoulder carried by the barrel and transmits an upward jolt to the stuck section.

The upward movement of the valve through the reduced diameter section and the free-stroke chamber to the point where the hammer and anvil contact is termed "the jarring stroke". The downward movement back through the free-stroke chamber and into the reduced diameter section is termed "the re-setting stroke".

It has been proposed in U.S. re-issue Pat. No. 23,356, issued to Storm, to provide a two-way hydraulic jar. Storm teaches positioning the restricted diameter section intermediate the ends of the barrel so that upper and lower free-stroke chambers of relatively short and equal length are defined at each end thereof. The mandrel and barrel are equipped with two sets of impact faces adapted to contact at the limits of the up and down movements of the mandrel. When the drill pipe is pulled up, the mandrel valve is drawn through the restricted section and the pipe is stretched; when the valve reaches the upper jar free-stroke chamber, the mandrel is jerked upwardly to its most extended position and delivers an upward jar. When the drill pipe weight is subsequently placed on the mandrel, the valve moves back down through the restricted section and the drill pipe is compressed; on the movement of the valve into the lower bumper free-stroke chamber, the compressed string elongates and the mandrel snaps downward to deliver a downward jar.

There are relatively few occasions, when dealing with stuck drill pipe, during which it is useful to alternatively jar up and down. What is desirable is to have a single tool which can jar repeatedly in either direction. The prior art tools do not work in this manner since weight must be put on the mandrel to force the valve down through the restricted section on the re-setting stroke. Since the weight compresses the lower portion of the string, there is an automatic, unwanted, downward jarring action. If one could accurately force the valve down just to the base of the restricted section and then start the next jarring stroke, this would not be a problem. However, the awkward equipment of a rig does not lend itself to accurate positioning of this type.

SUMMARY OF THE INVENTION

It is therefore an object of this invention to provide a single tool which can repeatedly jar upwardly without a downward jarring action during re-setting, and which can be repeatedly bumped downward when desired without having to jar upward.

It is another object to provide a tool of this type in which the sleeve valve is not deformed or belled on entering the restricted diameter area during the jarring stroke.

It is another object to provide a tool of this type which is adapted to cope with the severe shock load which can occur when the drill collars below the tool break free at a time when the string is stuck off bottom.

It is another object to provide a tool of this type in which the pressure within the hydraulic fluid chamber is equalized with the pressure within the drill pipe.

It is another object to equip the tool with a heavy spline joint or assembly having a unique clearing arrangement.

It is another object to equip the tool with a top seal which is protected from pinching and which is lubricated on both sides with every stroke cycle of the mandrel.

It is another object to provide a tool of this type in which the relatively long mandrel is centralized and stabilized so as not to damage the barrel.

It is another object to provide a tool of this type which has only two joint breaks and in which a one-piece bowl houses both the jar and bumper chambers.

It is another object to provide a tool adapted to accomodate relatively large O-ring seals which prolong the working life of the tool.

It is another object to provide a tool of this type which is equipped with removable stop means which limit the travel of the floating seal in the tool.

It is another object to provide a tool of this type having a sleeve valve adapted to be self-aligning when entering the restricted diameter section of the tool.

The tool according to the invention comprises a novel combination of elements. The combination includes telescopically arranged parts consisting of a tubular mandrel slidably received in spaced relationship within a tubular barrel. The barrel is formed with a valve-fitting section of reduced inside diameter intermediate its ends. The valve-fitting section separates two sections of the barrel wall; more particularly, it separates an upper jar free-stroke section, of relatively large effective inside diameter and short length, from a lower bumper free-stroke section, also of relatively large effective inside diameter but being substantially longer than the jar free-stroke section. The liquid-holding space defined between the mandrel and barrel is closed at its ends with upper and lower packing elements. The space is filled with a suitable operating liquid, such as a light oil. A spline joint is associated with the barrel and mandrel to prevent their relative rotational movement but permit of their relative longitudinal movement. Suitable threaded connections for tieing the tool into the drill string are also provided.

According to one feature of the invention, the tool includes valve means which provide first and second ducts connecting the bumper and jar chambers when the valve means is passing through the valve-fitting section. The first duct is open when the valve is moving through the valve fitting section toward the jar chamber. The cross sectional area of this duct is relatively small so that the operating oil escaping from the jar chamber into the bumper chamber may only do so at a slow rate. As a result, the relative longitudinal movement of the barrel and mandrel is retarded. The valve means also includes means which: (1) close the second duct, when the valve means is moving through the valve-fitting section toward the jar chamber on the jarring stroke; and (2) open it when the valve means is moving through said section toward the bumper chamber on the re-setting or bumping stroke. The second duct is sized so that the operating liquid may escape from the bumper chamber to the jar chamber during these latter strokes at a rate whereby there is relatively no pressure build-up within the bumper chamber and the mandrel may therefore move freely through the valve-fitting section.

As a result of this arrangement, the movement of operating liquid is restricted during the jarring and bumper re-setting strokes, so as to build up tension energy within the drill pipe. However, the liquid can rapidly escape from the bumper chamber during the jar re-setting and bumping strokes, thereby allowing the mandrel to drop freely through the valve-fitting section, that is, without substantial compression of the drill pipe.

According to another novel feature, the valve-fitting section is formed with one or more longitudinal grooves or flutes extending up from the bumper chamber part way to the jar chamber. Preferably, the grooves have a length substantially equal to the length of the sleeve valve. These grooves function to bleed off pressure from the jar chamber on entry of the valve into the valve-fitting section; deformation of the portion of the valve still in the large diameter bumper chamber does therefore not occur.

According to another feature, the valve comprises an annular sleeve, mounted on the mandrel, having one or both of its ends tapered. The tapered ends provide guide means for centralizing the sleeve as it enters the reduced-diameter valve-fitting section from the large-diameter chambers on either side thereof.

In another feature, the lower packing element carried by the mandrel is movable and is responsive to the pressure within the drill pipe. This is of particular importance when the tool is used in deep wells where the bottom hole pressure, generated by the column of drilling mud within the drill pipe, can be high enough to collapse the tool should there be no equalization of pressure across the tool walls. By providing a floating seal on the mandrel at the base of the liquid-holding space, the bottom hole pressure is transmitted to the operating oil through the seal and equalization is obtained. The floating seal also functions to centralize and stabilize the mandrel. Since the mandrel is much longer than it would be, for example, in a hydraulic jar tool, and since it is disposed in a relatively unsupported condition within the barrel, it has a tendency to wobble when it is rotated during drilling. This is, of course, undesirable since the mandrel may then slap against the barrel and one or both may be damaged. In accordance with the invention, the length of the annular body of the element is greatly increased over what was customary in the prior art and a substantial number of thick, spaced O-rings are mounted in its inner and outer surfaces, particularly adjacent each of its ends. The rings act to provide a seal, but they also serve as bearing surfaces to maintain separation of the mandrel and barrel. The floating seal therefore centralizes and stabilizes the mandrel, seals the bottom end of the liquid-holding space and provides for equalization of pressure.

According to another feature, the section of the barrel in which the floating seal is located is of slightly reduced diameter relative to the bumper and jar chambers and retaining means is provided at the upper end of this section to limit upward movement of the floating seal. In the event that a leak past either the upper or lower seals should occur, with a concomitant escape of hydraulic oil, the floating seal will be drawn upwards into the bumper chamber on the jarring stroke. When the mandrel moves downward again, there is a likelihood that the floating seal will jam at the entrance to the seal section and render the tool inoperative. To avoid this difficulty, threaded pins are screwed through threaded openings in the side of the barrel so as to protrude inwardly at the upper end of the seal section. These pins prevent the floating seal from leaving the seal section. The pins are removable so that the valve can be inserted into the barrel during assembly of the tool. If removable pins are not used, then one must insert in the tool, above the floating seal, a sub having an inwardly-projecting shoulder. The shoulder would provide the means for limiting travel of the seal. The problem with using a sub is that it introduces a third joint break into the tool and difficulties can arise in sealing its threads so that hydraulic oil is not lost. Taper-threaded removable pins provide a much better solution to the problem.

In another feature, the tool is equipped with heavy duty, external locking means of novel design. Most oil well tools having telescoping parts are provided with locking means, such as a spline joint, which locks the parts together with reference to rotational movement but permits them to move longitudinally relative to each other. The spline joint can be an internal joint, in which case the spline parts are located within the barrel; alternatively, it can be an external joint, in which case the parts are separate from the barrel. The former joint is relatively weak since its walls have to be thin in order to fit the unit within the barrel. In the latter case, the joint is much more rugged as it is not subject to the same dimensional limitations. However, there is a structural factor in an external spline joint which makes it unattractive for the type of tool proposed herein. The joint comprises a tubular male spline, which connects at its upper end to the drill pipe and at its lower end to the mandrel, and a female spline member which connects at its lower end to the upper end of the barrel. The male spline member is slidably received within the female spline member and the two parts are provided with longitudinal splines which interlock. When the members are displaced longitudinally relative to each other, mud from the well bore enters the void spaces left between the splines of the female member. This mud carries cuttings and other solids suspended within it. When the joint is closed, there must be provision for the removal of this material from the void spaces. It is usual to provide a series of transverse ports through the wall of the female member at its base for this purpose. However, the cuttings and solids build up within the female member and frequently block off the ports. They can only be cleared by setting drill pipe weight onto the male spline member and forcing it into the female member, thereby ejecting the solids out horizontally through the ports. This is a serious defect in the joint for the purposes of this tool as the dropping of the string weight during the bumper stroke will cause the male spline to encounter the built-up solids prior to the hammer contacting the anvil.

To overcome this disadvantage, an inwardly tapered extension of the barrel's pin is provided and the ports in the female spline member are downwardly slanted. A slide leading to the port openings is thus provided. As a result, relatively little downward force need be exerted by the male spline member to eject solids collected within the female spline member.

In accordance with another feature of the invention, an improved top seal arrangement is provided. Prior art top seals in hydraulic jars usually have O-rings mounted in channels cut in the inner surface of the threaded portion of the barrel pin which connects with the female spline member. The tolerance between the barrel and mandrel at the seal point has to be very small, in the order of 0.003 inches; otherwise, the pressure differential across the seal will tend to deform the O-rings and damage them. When the female spline member is threaded into the barrel, over-torquing often occurs and the O-rings are pinched between the two metal bodies. In addition, the O-rings are only lubricated with oil on the lower side as the mandrel reciprocates back and forth through them during jarring or bumping. Pinching and lack of lubrication lead to excessive wear and break-down of the O-rings. This seal break-down is probably the single greatest cause of tool failure in this type of equipment.

In the present tool, O-ring seals are mounted in the inner surface of the barrel pin; however, the rings are located in the thick shoulder portion of the pin. The threaded end of the pin is bored to provide a clearance of about 0.010 inches between the mandrel and barrel. A wiper O-ring, adapted to keep out mud and cuttings and permit the transmittal of pressure thereacross but being capable of retaining lubricant therebeneath, is mounted in a groove cut in the interior surface of the threaded portion. The annular space between the pressure seals and the wiper ring is filled with grease or a like lubricant. By virtue of this arrangement, pressure is still equalized across the seals, pinching is eliminated, and the mandrel is lubricated on both sides of the seal.

*In its essentials, the invention provides a tool in which the barrel and mandrel cooperate to form longitudinally spaced jar free-stroke and bumper free-stroke passages for relatively rapid by-passing movement therethrough of operating liquid. The barrel free-stroke passage sections are separated by another barrel section, which can be referred to as the first section. The mandrel and barrel first section each carry a portion of a valve mechanism. When the mandrel portion of the valve mechanism is passing through the first section on the jarring stroke, only the first duct is open, and the second duct is closed, so that operating liquid can only pass relatively slowly from the jar free-stroke passage to the bumper free-stroke passage, thereby providing the desired retardation of movement. When the mandrel portion of the valve mech-*

*anism is passing through either of the free-stroke passage sections, the operating liquid can be easily displaced through the adjacent passage and therefore there is no significant retardation. When the mandrel portion of the valve mechanism is passing through the first section on the re-setting or bumping strokes, the second duct is opened, permitting rapid by-passing of the operating liquid from the bumper free-stroke passage to the jar free-stroke passage so that retardation is again substantially eliminated. The tool is designed to provide an effective bumper stroke which is substantially longer than the effective jar stroke. Preferably this is done by providing a bumper free-stroke passage which is substantially longer than the jar free-stroke passage. By effective bumper stroke is meant the distance moved by one tubular part relative to the other from the time the mandrel portion of the valve mechanism leaves the portion of the first section, effective to cause retardation on the jarring stroke, until the impact faces limiting the bumping stroke contact. By effective jarring stroke is meant the distance moved by one tubular part relative to the other from the time the valve means carried by the mandrel leaves the first section on the jarring stroke, thereby permitting relatively free by-pass of operating liquid, until the impact faces limiting the jarring stroke contact. In any case, by providing a short jar stroke, dissipation of energy stored in the drill string during the jarring movement is minimized; by providing a long bumper stroke, the downward force of the falling drill string is maximized.*

Broadly stated, the tool comprises: telescopically arranged tubular parts comprising an outer barrel and an inner mandrel received in the barrel in spaced relationship therewith so that liquid-holding space is defined therebetween, said barrel and mandrel being movable longitudinally relative to each other between a collapsed bumping position and an extended jarring position; upper and lower packing elements sealing off the ends of the liquid-holding space so that it is adapted to retain a body of operating liquid; first and second means connecting the mandrel and barrel and adapted to lock them together for rotational movement but permit of relative longitudinal movement thereof, said first means and the mandrel forming a first unit, said second means and the barrel forming a second unit; means associated with the tubular parts for operatively connecting them into a drill string; said barrel having a bumper free-stroke section of relatively large effective inside diameter, a valve-fitting section of relatively reduced inside diameter, and a jar free-stroke section of relatively large effective inside diameter, said bumper free-stroke section being of substantially greater length than the jar free-stroke section, said first and third sections combining with the mandrel to define a bumper chamber and a jar chamber respectively; valve means carried by at least one of the parts and comprising first duct means, connecting the chambers, through which operating liquid may relatively slowly pass, second duct means connecting the chambers, and means arranged to close the second duct means when the valve means is passing through the valve-fitting section toward the jar chamber, said second duct means being sized to permit operating liquid to pass from the bumper chamber to the jar chamber, as the valve means is passing through the valve-fitting section toward the bumper chamber, at a relatively rapid rate; said bumper chamber and jar chamber being adapted, due to their relatively large effective inside diameter, to permit operating liquid to quickly bypass around the valve means when it is passing pair of first impact faces, one such impact face being carried by each unit and arranged to contact each other to limit the longitudinal movement of the units relative to each other to the extended, jarring position; and a pair of second impact faces, one such second impact face being carried by each unit and arranged to contact each other to limit the longitudinal movement of the units relative to each other to the collapsed bumping position.

DESCRIPTION OF THE PREFERRED EMBODIMENT

General Summary

Figure 1A:
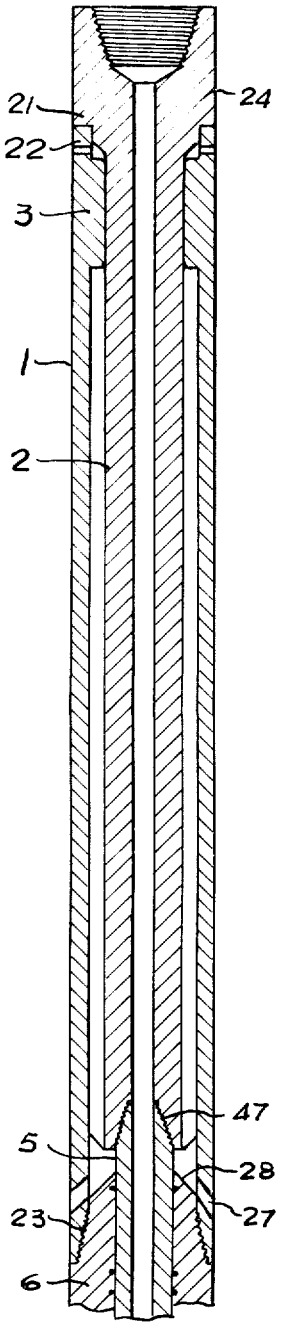
FIGS. 1a, 1b and 1c are sectional side views of the upper, middle and lower sections of the tool in the closed or collapsed position.
Figure 1B:
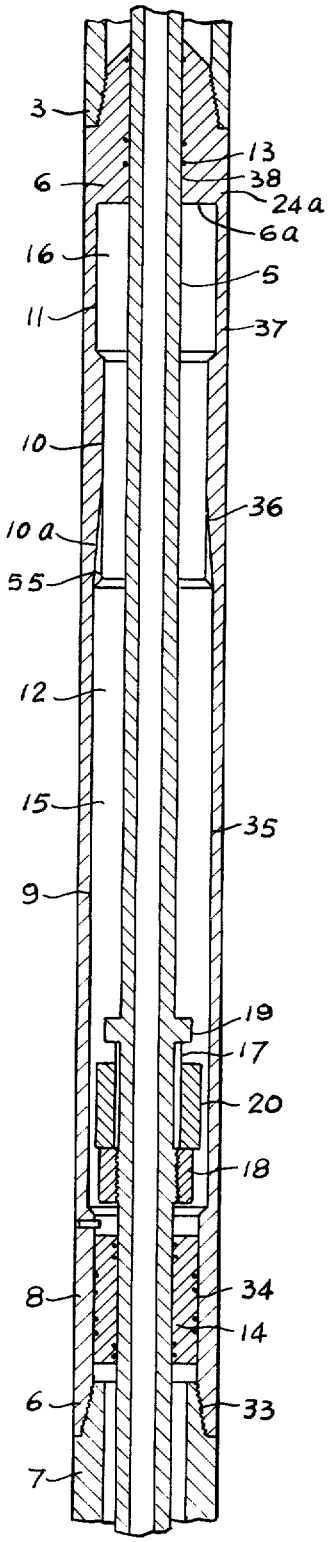
Figure 1C:
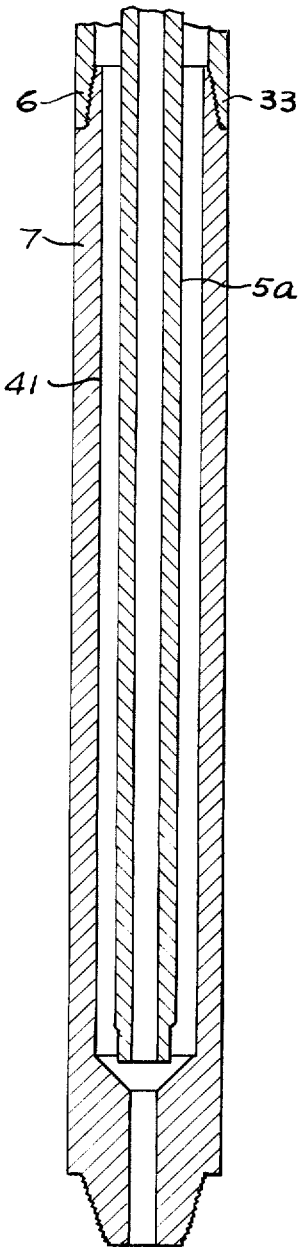

Turning now to FIGS. 1a, 1b and 1c, there is shown a tool A in accordance with the invention. Tool A includes a spline assembly 1 comprising telescoping male and female spline members 2, 3. Male spline member 2 connects at its upper end with the drill string (not shown) and at its lower end with mandrel 5. Female spline member 3 is connected at its bottom end with barrel 6. Barrel 6, in turn, screws on to bottom sub 7 *to provide barrel means* which connects back to the bottom section of the drill string (not shown). Barrel 6 is formed with a floating seal section 8, a bumper free-stroke section 9, a valve-fitting section 10, and a jar free-stroke section 11. An annular space 12 is defined between mandrel 5 and barrel 6. This space 12 is closed at its ends by packing elements, that is a fixed seal 13 and floating seal 14. Bumper chamber 15 and jar chamber 16 are the portions of annular space 12 defined by sections 9 and 11 respectively. Mandrel 5 includes a valve slide base 17 having an annular valve seat 18 at its lower end and a stop or hammer 19 at its upper end. A sliding sleeve valve 20 is axially shiftable on slide base 17. At the end of the jarring stroke, hammer 19 strikes anvil shoulder 6a at the upper end of barrel 6. A second hammer and anvil combination is provided on the bumping stroke by shoulder 21 of male spline member 2 and shoulder 22 of female spline member 3.

Spline Assembly

Figure 5:
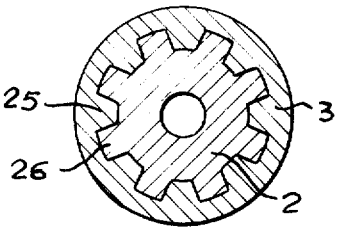
FIG. 5 is a cross-sectional view of the tool through the meshed splines of the female and male member.

Spline assembly 1 is of the open type. It includes a tubular female member 3 having a threaded lower end 23. The externally threaded pin 24b of barrel 6 is screwed into end 23. Male member 2, also tubular in form, is slidably received within female member 3. Male member 2 has a threaded box 24 at its upper end for connection with the upper section of the drill string, and is internally threaded at its lower end and screwed on to the threaded pin 47 of mandrel 5. As shown in FIG. 5, female member 3 has spaced, internal, longitudinal splines 25; male member 2 has spaced, external longitudinal splines 26. The two sets of splines 25, 26 intermesh.

It is thus seen that the upper section of the drill string, the male spline member and the mandrel form a continuous unit which can be reciprocated longitudinally by the drilling rig. The female spline member, the barrel and the bottom sub form a second unit in combination with the bottom section of the drill string. The male member can slide longitudinally within the female member, but relative rotational movement is precluded by the intermeshed splines.

Figure 6:
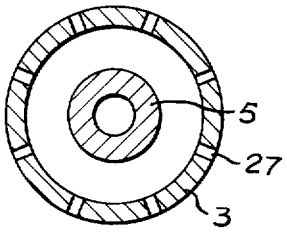
FIG. 6 is a cross-sectional view of the tool through the bottom female spline ports.

Female spline member 3 has a plurality of ports 27 for the removal of solids trapped therewithin. Ports 27 are spaced around the circumference of the lower end of female member 3, as shown in FIG. 6. They are slanted downward, as illustrated in FIG. 1a. Pin 24b of barrel 6 is tapered at 28 and combines with slanted ports 27 to provide a number of slides. Solids can be easily forced along these slides for removal through ports 27 when splines 25, 26 are closed.

Figure 4:
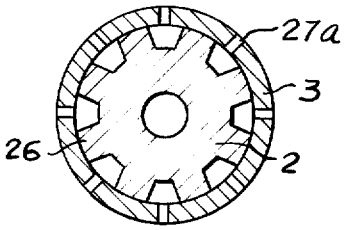
FIG. 4 is a cross-sectional view of the tool through the top female spline ports.

Female spline member 3 also has a plurality of ports 27a for the removal of solids. Ports 27a are spaced around the circumference of the upper end of female member 3, as shown in FIG. 4.

Box 24 of male spline member 2 is formed with a shoulder 21 at its lower end. Shoulder 21 functions as a hammer or impact face. The upper shoulder face 22 of female spline member 3 functions as an anvil; when tool A is collapsed, shoulder 21 and face 22 come into contact.

Figure 10:
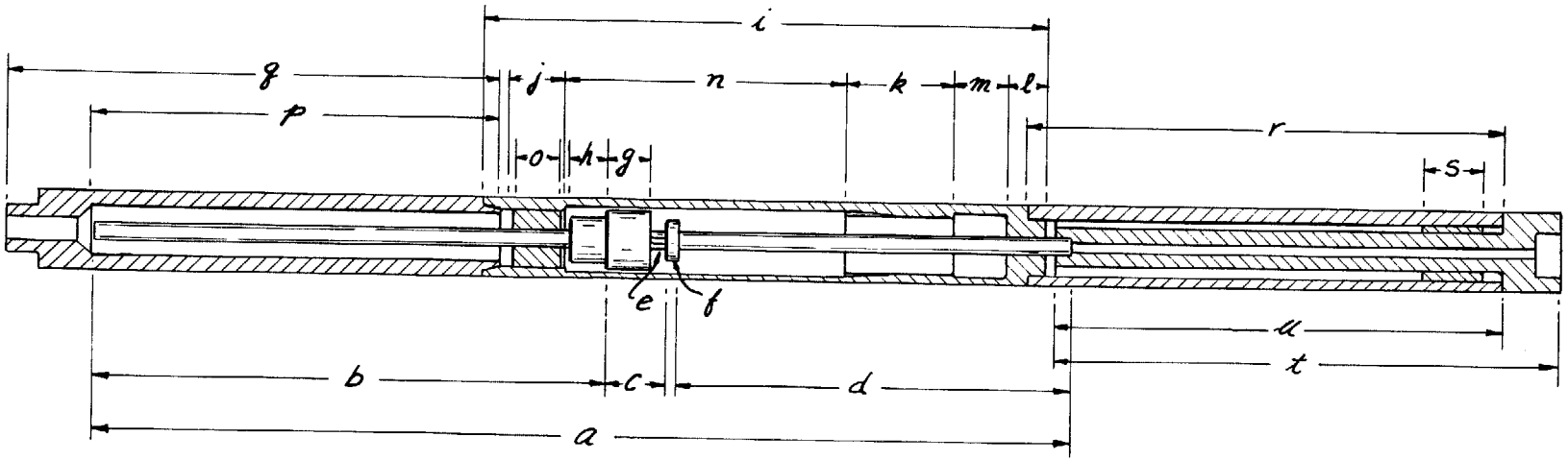
FIG. 10 is a view similar to FIGS. 1a, 1b, 1c in which important dimensions, which appear in Table 1, have been lettered.

The preferred dimensions for a 6 ¾ inch outside diameter tool are shown in FIG. 10. Those familiar with jarring tools will appreciate the improvement in strength which has been obtained by incorporating an open-type spline assembly having easily cleared ports.

Top Seal

A novel top seal arrangement is provided between sliding mandrel 5 and stationary barrel 6. More particularly, a pair of spaced, annular grooves 29 are provided in the thick-walled shoulder portion 24a of barrel pin 24b. A shallow, annular groove 30 is provided in the thin-walled, threaded portion. Quarter inch O-rings, with barbacks, are mounted in grooves 29 to provide a pressure-tight seal. A one-eighth inch wiper O-ring is provided in groove 30 adapted to retain grease in lubricant space 31 but permitting pressure equalization to take place across it. A tight fit (e.g. 0.003 inches tolerance) is provided between shoulder portion 24a and mandrel 5, but a loose fit (e.g. 0.010 inches tolerance) is provided between threaded pin 24b and mandrel 5.

This arrangement has a number of advantages. By positioning seals in shoulder portion 24a, large O-rings can be used without unduly weakening the tool. Pinching of the rings in grooves 29, by over-torquing female spline member 3 when making up tool A, is avoided. By adding the wiper ring a chamber or space 31 adapted to contain lubricant is provided immediately above upper ring 29. Thus rings 29 are lubricated from both directions when mandrel 5 is reciprocated back and forth. The provision of large rings and lubrication in the manner shown has the effect of greatly extending seal life.

The Barrel

Barrel 6 is a one-piece tubular member having a threaded pin 24b at its upper end, for connection with female spline member 3, and a threaded box 33 at its lower end, for connection with bottom sub 7. *The barrel 6 and bottom sub 7 combine to form barrel means.* In sequence from its bottom end, the wall of barrel 6 is formed to provide: a floating seal section 8 having an internal bore 34 of relatively reduced diameter; a bumper free-stroke section 9 having an internal bore 35 of relatively large diameter; a valve-fitting section 10 having an internal bore 36 of relatively reduced diameter, a jar free-stroke section 11 having an internal bore 37 of relatively large diameter; and a pin 24b having an internal bore 38 of substantially reduced diameter. The function of bores 37 and 38 provides an annular shoulder 6a which functions as an anvil on the jarring stroke. Suitable dimensions for barrel 6 are illustrated in Table I for a tool having an outside diameter of 6 ¾ inches and a mandrel with an outside diameter of 4,500 inches.

These dimensions have been selected keeping the following objects in mind: the length of barrel 6 should be as short as possible to permit of mandrel 5 being rigid and strong. The internal diameters of jar chamber 16 and bumper chamber 15 should be kept small so as to avoid unduly weakening the barrel wall. The clearance between sleeve valve 20 and valve-fitting section 10 should be narrow enough to supply enough retardation of fluid flow to permit the drill pipe to be stretched with a pull in the order of 100,000 pounds over the string weight. Finally, bumper chamber 15 should be sufficiently long to permit the falling drill pipe to generate the desired bumping impact.

It is desirable to provide the close-fitting sections 8, 10 with a smooth inner surface of constant diameter. This may be achieved by boring each section to a smooth finish, honing and chroming the bore surface, grinding the chromed section to within 0.001 inches of end size, and hone finishing it to within 0.0001 inches tolerance.

In an alternative form, sections 9 and 11 can have interior bores equal to that of section 10; the walls of sections 9, 11 would be fluted to accomodate operating oil and provide passages whereby oil could easily bypass sleeve 20 when it passes therethrough. When the expression "section of relatively large effective inside diameter" is used herein, it is intended to be applicable to a section such as that shown in the drawing and a section such as is described in this paragraph.

The Bottom Sub

The drill collars normally attached to the bottom of tool A have a longitudinal bore which is too small to accomodate mandrel 5. Hence it is necessary to insert a sub 7 having an internal bore 41 of the desired dimensions.

The Floating Seal

This element has several functions in the tool. It seals the bottom end of annular space 12 and holds the operating liquid therewithin while keeping contaminating drilling mud out. Because it is slidably mounted on mandrel 5 and is exposed at its lower face to the pressure within the internal bore 42 of mandrel 5, seal 14 also serves to transmit the pressure of the mud column in the drill string to the operating liquid in annular space 12. This equalization of pressure prevents the collapse of barrel 6 onto mandrel 5 from taking place. Finally, seal 14 centralizes and stabilizes the long, thin mandrel 5 within barrel 6; this prevents the parts slamming together and damaging each other. Seal 14 comprises an elongate, annular body 43 carrying O-rings 43a at each end on both its inner and outer surfaces. Body 43 is formed of a relatively soft material, such as brass, which will not score mandrel 5 or barrel 6.

The Pins

If a floating seal 14 is used in tool A, it is desirable to provide means at the upper end of seal section 8 to limit the seal's upward movement. This is done to prevent seal 14 following sleeve valve 20 into bumper chamber 15 should a leak develop at top seal 13. If floating seal 14 moves into bumper chamber 15, it has a tendency to become twisted and may jam the tool. By limiting the travel of seal 14 to the tight-fitting, chromed seal section 8, this problem is avoided; if there is a leakage, drilling mud may gradually replace the lost oil but the bumping section of tool A will usually continue working for a limited period of time.

The limiting means preferably comprises a plurality of tapered, threaded pins 45 screwed into openings 46 in the barrel wall. Steel pins may be used which shear at 20,000 p.s.i. and extend into bore 34 about one-fourth inch. Since pins 45 are threaded, they can be removed when assembling the tool to allow valve sleeve 20 to slide into place.

The Mandrel

Mandrel 5 is a tubular member having a threaded pin 47 at its upper end for connection with male spline member 2 and, ultimately, with the upper portion of the drill string. Intermediate its ends, mandrel 5 carries an annular hammer 19. Below hammer 19, the cylindrical shape of mandrel 5 is altered by the provision of six flats 48 which form a slide base 17. Threads 49 are cut in the mandrel's outer surface at the bottom of slide base 17 and an annular valve seat 18, having a ground upper face 18a, is screwed thereon. The tailpipe 5a of mandrel 5 is long enough to still extend through seal 14 when tool A is fully extended and hammer 19 is in contact with shoulder 6a.

The Valve

Figure 8:
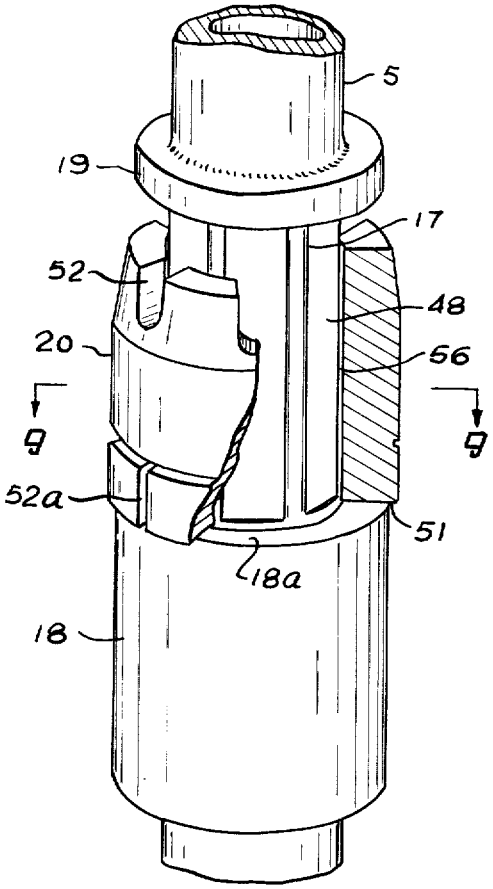
FIG. 8 is a perspective view of the valve and valve seat mounted on the mandrel, cut away to show the slide base and by-pass passages.
Figure 9:
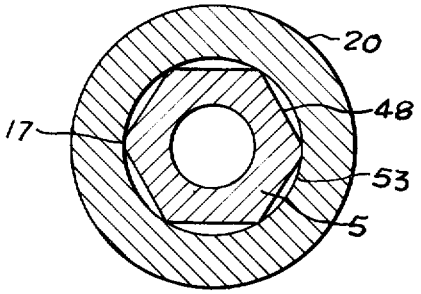
FIG. 9 is a cross-sectional view of the valve mounted on the mandrel showing the slide-base and by-pass passage.

A known valve 20 suitable for use in this tool is shown in FIG. 8. It comprises an annular body which is slidably mounted on slide base 17 between hammer 19 and seat 18. Valve 20 combines with slide base 17 to define between them a number of axial by-pass passages 53, (termed hereinbefore "second duct means") as shown in FIG. 9. A ground face 51 at the valve's lower end cooperates with face 18a, when mated therewith, to provide liquid-tight closure of passages 53. Otherwise stated, faces 51 and 18a provide means for closing the second duct means when the valve 20 is passing through the valve-fitting section 10 toward the jar chamber 16. The exterior surface of valve 20 combines with the surrounding interior surface of the valve fitting section of the barrel to define an annular, axial passage 54. When the valve 20 is passing through the valve-fitting section 10 on the jarring stroke, the passage 54 acts to meter the oil and only permits it to escape slowly therethrough from the jar chamber 16 to the bumper chamber 15. When so functioning, the passage 54 is providing first duct means, as previously referred to. Valve 20 has notches 52 formed in its upper end and grooves 52a cut in its outer surface. Notches 52 function to provide communication between passages 53 and jar chamber 16 when valve 20 is seated against hammer 19. Grooves 52a function to increase the cross sectional area of the passage 54 when the valve 20 is clearing the valve-fitting section 10 on the jarring stroke; the high pressure within the jar chamber 16 is enabled to bleed off rapidly, and thus belling out of the lower end of the valve 20 is reduced. Valve 20 is tapered at its upper end at 20a. This ensures that the valve is self-aligning when it enters valve-fitting section 10.

Valve-Fitting Section Grooves

Figure 7:
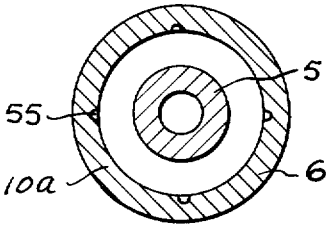
FIG. 7 is a cross-sectional view of the tool through the valve-fitting section of the bowl showing the pressure relief grooves.

Valve-fitting section 10 has one or more longitudinal grooves 55 formed in its inner surface 10a, as shown in FIG. 7. Grooves 55 extend from the lower edge of section 10 part way up to its upper edge. Preferably, grooves 55 have a length substantially equal to the length of valve 20 and are gradually tapered in depth from the bottom end to the top end. By providing these grooves 55, valve 20 can be drawn completely into section 10 before it is fully effective and the highest pressures are reached within jar chamber 16. The reason for this arrangement is made clear hereinbelow.

Operation

In FIGS. 1a, 1b, 1c, tool A is collapsed, as it would appear at the bottom of a bumping stroke or during drilling. In this position mandrel tailpipe 5a extends to the base of bore 41; valve 20 is at the base of bumper chamber 15; and hammer shoulder 21 and anvil 22 are in contact. Floating seal 14 is disposed around mandrel 5 roughly at its mid-point and centralizes and stabilizes it within barrel 6. Seal rings 43a protect body 43 from damage by mandrel 5 or barrel 6.

Figure 3A:
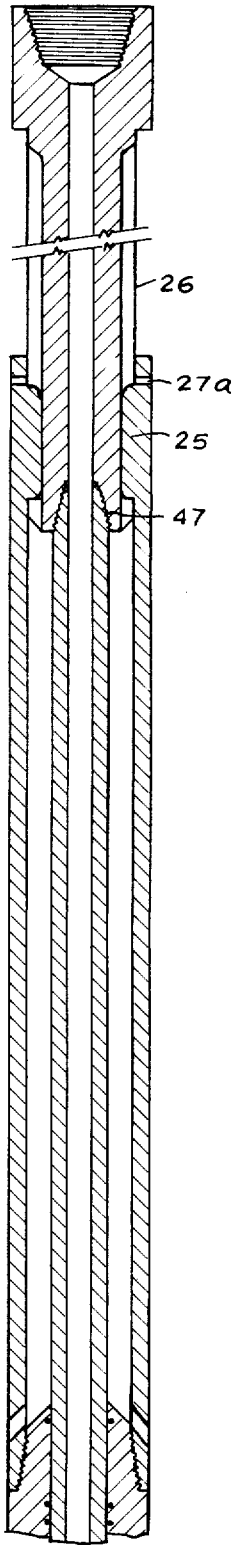
FIGS. 3a, 3b and 3c are sectional side views of the same sections showing the tool in the extended or open position.
Figure 3B:
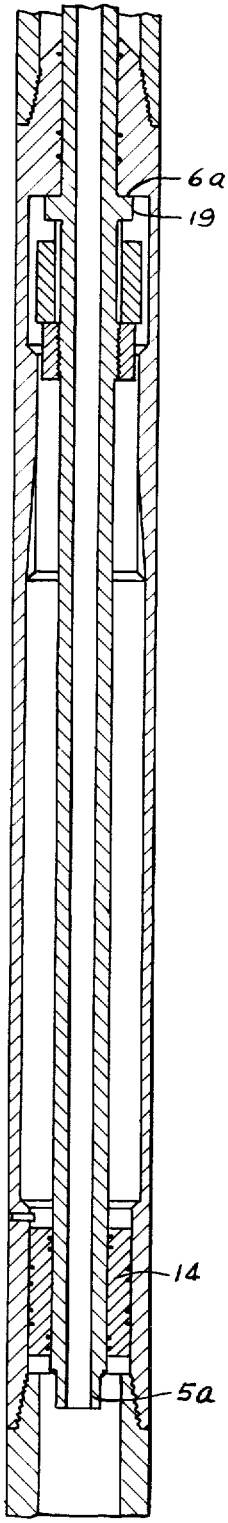
Figure 3C:
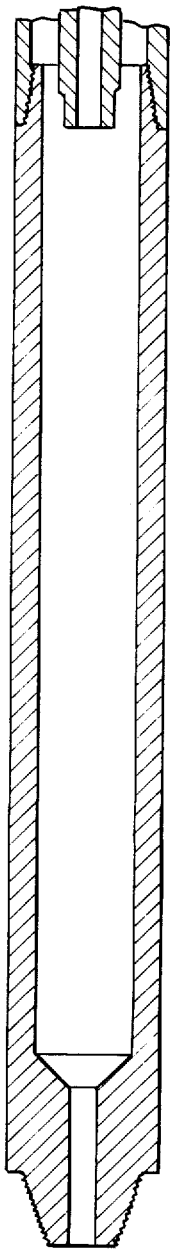

In FIGS. 3a, 3b, 3c, tool A is fully extended, as it would appear at the end of the jarring stroke or when tripping in or out of the well. As shown, valve 20 is in jar chamber 16 and hammer 19 is in contact with anvil shoulder 6a. The bottom end of tailpipe 5a is still within floating seal 14.

Figure 2A:
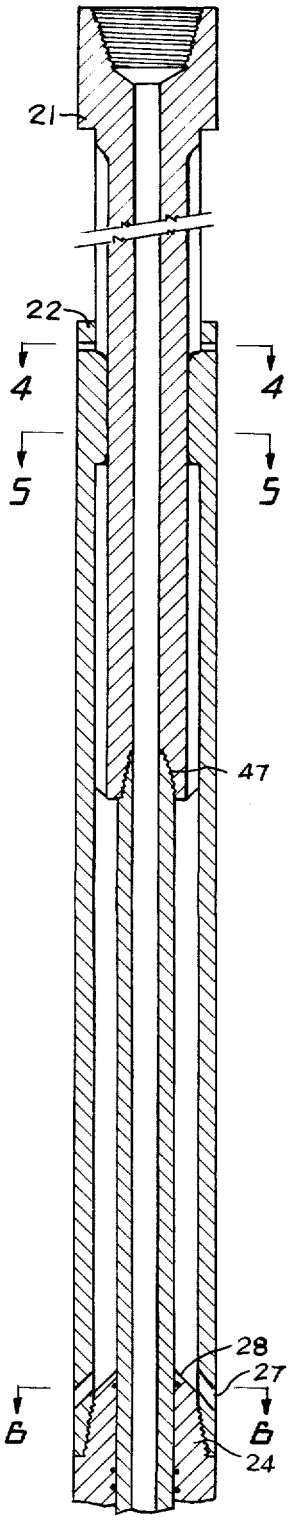
FIGS. 2a, 2b and 2c are sectional side views of the same sections showing the tool at the beginning of the jarring or bumping stroke.
Figure 2B:
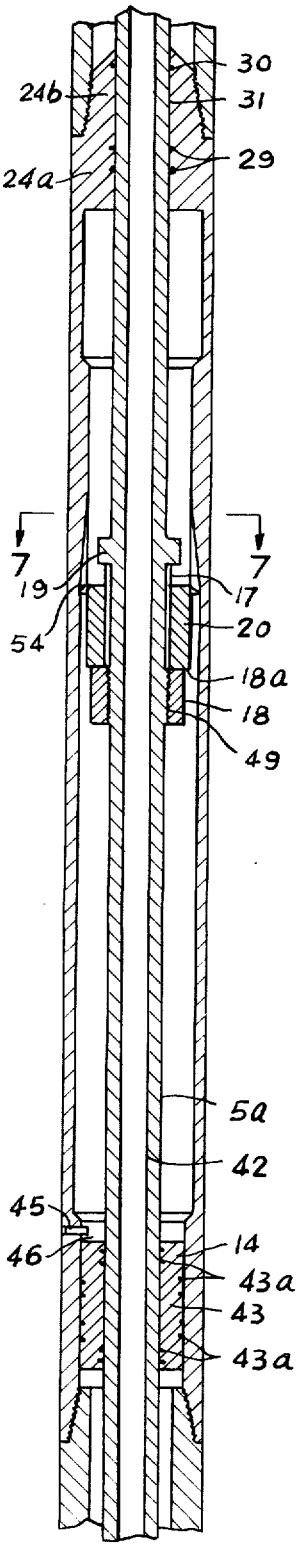
Figure 2C:
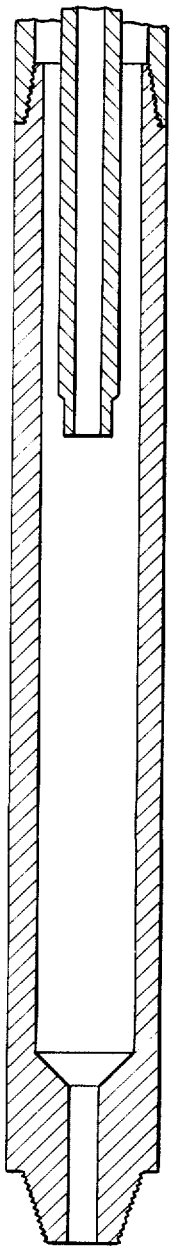

In FIGS. 2a, 2b, 2c, tool A is shown ready to commence the bumping or jarring strokes. At this point, mandrel 5 has been drawn upwards until valve 20 is positioned at the base of valve-fitting section 10. Frictional contact with surface 10a has shifted valve 20 downward so that face 51 is seated against face 18a and by-pass passages 53 are closed.

If the driller wants to bump, he releases the drill pipe. As mandrel 5 begins to drop, frictional contact unseats valve 20, thereby opening by-pass passages 53. The oil in bumper chamber 15, which is being compressed by the downward movement of valve 20, is able to escape to jar chamber 16 through axial, annular passage 54 and passages 53. As a result, valve 20 is able to drop easily through section 10. Mandrel 5 continues moving downward until hammer shoulder 21 and anvil face 22 slam together. *The distance moved by the mandrel 5 from the position where the valve 20 leaves the effectively retarding portion of section 10 to where the hammer shoulder 21 and anvil face 22 meet is termed the effective bumper stroke.* The downward impact is transmitted to the drill collars through barrel 6 and sub 7.

If the driller wants to jar, he actuates the rig to continue drawing the drill pipe upward. The upward movement of valve 20 compresses the oil within jar chamber 16. The oil can only escape slowly through axial, annular passage 54. The pressure within jar chamber 16 rises to 5,000 to 10,000 p.s.i. as the drill pipe stretches. Valve 20 is, of course, simultaneously moving slowly up through valve-fitting section 10. When valve 20 moves out of section 10 into jar chamber 16, the stretched drill pipe contracts and mandrel 5 is jerked upward with terrific force. When hammer shoulder 19 and anvil shoulder 6a meet, an upward jar is delivered to barrel 6, sub 7 and the drill collars. *The distance moved by the mandrel 5 from the position where the valve 20 moves out of section 10 to where the hammer shoulder 19 and anvil shoulder 6a meet is termed the effective jar stroke.* To reset tool A for another jarring stroke, the drill pipe and mandrel 5 are lowered by the rig. When valve 20 enters valve-fitting section 10, frictional contact with surface 10a shifts valve 20 upward. Face 51 is unseated and by-pass passages 53 are opened. Valve 20 is limited in its upward movement by hammer 19. Oil moves from bumper chamber 15 into passages 53 and through notches 52 into jar chamber 16. Valve 20 can thus easily move through section 10 without any need for application of drill pipe weight to force it through. The driller will halt the downward movement of mandrel 5 when he estimates, by measurements at surface, that valve 20 has moved into bumper chamber 15. Tool A is then ready for another jarring stroke.

When valve 20 first moves upward into section 10 from bumper chamber 15, grooves 55 bleed off some of the pressure generated within jar chamber 16 so that there is only a gradual buildup in pressure. If grooves 55 are not present, there is an immediate increase in pressure within jar chamber 16 to 5,000 to 10,000 p.s.i. This pressure is, of course, exerted against interior surface 56 of valve 20. Since the lower end valve 20 is still disposed within the large-diameter bumper chamber 15, which is at a relatively low pressure, belling out of valve 20 occurs. When grooves 55, substantially equal in length to valve 20, are provided, there is sufficient bleed-off of pressure to permit valve 20 to become fully inserted within section 10 before high pressures are generated. Once within section 10, valve 20 is supported at its sides and belling is no longer a serious problem. In addition, grooves 55 protect barrel 6 from being ruptured. If one is bumping off bottom and the drill collars break free, they fall the length of the bumper section until the valve 20 reaches valve-fitting section 10. There is an instantaneous shock load imposed with a concurrent build-up of pressure within jar chamber 16 as the falling drill collars try to drag section 10 over valve 20. This pressure is usually sufficient to rupture the wall of barrel 6. The grooves 55 provide a means for gradually dissipating the energy which is created by the drop of the collars. This energy is dissipated by the movement of oil from jar chamber 16 through grooves 55.

Advantages

A sturdy tool adapted to work at great depth is provided. The problems which arise from having a long, semi-flexible mandrel and a large diameter bore beneath the valve-fitting section are solved. More specifically, mandrel centralization, and control of valve belling and movement of the floating seal out of its bore have been provided for in a practical manner. The tool can be used to repeatedly jar upwards or bump downwards. It is simple to build and maintain and has only two joint breaks to cause problems.

Listed below in Table I are the preferred dimensional relationships which have been developed for a 6 ¾ inch O.D. tool. The dimensions are not to be considered limitations on the invention, since they may be departed from without serious results. However, dimensions do play an important role in the strength and proper operations of these tools and hence these dimensions are given to be used as a guide.

TABLE I

DIMENSIONS FOR 6¾" O.D. TOOL

| Member | FIG. 10 Letter | Dimension | Description |
|---|---|---|---|
| Mandrel | a | 94 | overall length |
| | | 4.500 | outside diameter |
| | | 2.750 | inside diameter |
| | b | 45 | distance from bottom to top of valve seat |
| | c | 3.750 | length of slide base |
| | d | 44 | distance from top to hammer |
| | e | 4.250 | thickness of slide base |
| | f | 5.305 | outside diameter of hammer |
| Valve | g | 3.250 | length |
| | | 5.498 | outside diameter |
| | | 4.695 | inside diameter |
| | | .001 | annular clearance between valve and valve-fitting section |
| Valve seat | h | 3.750 | length |
| | | 5.315 | outside diameter |
| Barrel | i | 60 | overall length |
| | j | 8 | length of floating seal section |
| | k | 8 | length of valve-fitting |
| | l | 7 | length of pin and shoulder section |
| | m | 9 | length of jar chamber |
| | n | 23 | length of bumper chamber |
| | | 6.875 | outside diameter |
| | | 4.510 | inside diameter of pin section |
| | | 5.510 | inside diameter of floating seal section |
| | | 5.500 | inside diameter of valve-fitting section |
| | | 5.625 | inside diameter of jar chamber |
| | | 5.750 | inside diameter of bumper chamber |
| Floating seal | o | 5.500 | overall length |
| | | 4.506 | inside diameter |
| | | 5.504 | outside diameter |
| Bottom sub | p | 29 | length of bore |
| | q | 42 | overall length |
| | | 4.75 | inside diameter of bore |
| Female spline | r | 54.5 | overall length |
| | s | 14 | spline length |
| | | 6.875 | outside diameter |
| Male spline | t | 60 | overall length |
| | u | 50 | spline length |

*What is claimed is:*

1. A hydraulic tool for use in a drill string, which comprises:

telescopically arranged tubular parts comprising an outer barrel and an inner mandrel received in the barrel in spaced relationship therewith so that an annular space is defined therebetween, said mandrel being longitudinally movable between a collapsed bumping position and an extended jarring position;

a spline assembly comprising a tubular male spline member connected at its lower end to the upper end of the mandrel, said member having means at its upper end for threadably connecting it into a drill string, and a female spline member slidably receiving the male spline member and connected at its lower end to the upper end of the barrel, said female spline member having ports in the lower end of its wall to permit of the escape of material trapped between the spline members;

said spline members having interlocking splines which lock them together with reference to rotational movement but permit of relative longitudinal movement;

fixed upper and floating lower packing elements sealing off the ends of the annular space to form a chamber for retaining a body of operating liquid;

a [bumper] *bottom* sub connected at its upper end to the lower end of the barrel and adapted to be connected into the drill string at its lower end, said sub having a counterbore to accommodate the lower end of the mandrel when it is in the collapsed bumping position;

said barrel having a floating packing section, a bumper free-stroke section of relatively large effective inside diameter, a valve-fitting section of relatively reduced inside diameter, and a jar free-stroke section of relatively large effective inside diameter, said bumper free-stroke section being of substantially greater length than the jar free-stroke section, said bumper free-stroke and jar free-stroke sections combining with the mandrel to define a bumper chamber and a jar chamber respectively;

stop means, protruding inwardly from the barrel wall at the upper end of the floating packing section, adapted to limit upward movement of the floating lower packing element;

valve means carried by one or both of the parts and comprising, when passing through the valve-fitting section, first duct means, connecting the chambers, through which operating liquid may relatively slowly pass, second duct means connecting the chambers, and means arranged to close the second duct means when the valve means is passing through the valve-fitting section toward the jar chamber, said second duct means being sized to permit operating liquid to pass from the bumper chamber to the jar chamber, as the valve means is passing through the valve-fitting section toward the bumper chamber, at a sufficiently rapid rate whereby the mandrel may move freely through the valve-fitting section;

said bumper chamber and jar chamber being adapted, due to their relatively large effective inside diameter to permit operating liquid to quickly bypass around the valve means when it is passing therethrough; and impact faces, carried by the tubular parts, arranged to contact to limit the movement of the tubular parts to the collapsed bumping position and extended jarring position.

2. The tool as set forth in claim 1 wherein:

the packing element at the end of the bumper chamber comprises an elongate, annular body carrying sealing means on its inner and outer faces adjacent each end thereof;

said element being mounted on said mandrel and being adapted to be moved axially thereon in response to pressure within the drill string, said sealing rings providing a pressure tight seal between the body and the adjacent inner surfaces of the mandrel and barrel.

3. The tool as set forth in claim 2 wherein the valve means comprises:

a slide base, comprising a plurality of longitudinally extending flat areas formed on the exterior surface of the mandrel, outwardly protruding stop means at the upper end of the slide base, an annular seat at the lower end of the slide base, and a substantially cylindrical sleeve slidably mounted on the slide base between the stop means and seat, the outside surface of the sleeve combining with the inside surface of the valve-fitting section to define a peripheral passage which is the first duct means, said sleeve having a transverse opening at its stop means end and a face on the end directed toward the seat for cooperating therewith to provide liquid tight closure when the valve means is moving through the valve-fitting section toward the jar chamber, said sleeve combining with the slide base to define the secondary duct means, said sleeve being adapted, when drawn upwardly through the valve-fitting section, to rest on the annular seat, thereby closing the bumper chamber end of the second duct means, said sleeve, since it is axially shiftable, being adapted to be forced upwardly by fluid pressure created in the bumper chamber when the sleeve enters the upper end of the valve-fitting section, thereby opening the second duct means to allow operating liquid to by-pass from the bumper chamber to the jar chamber.

4. The tool as set forth in claim 3 wherein:

the barrel wall defines at least one threaded opening at the upper end of the floating packing section; and the stop means comprises a threaded pin screwed into the barrel opening so as to protrude inwardly from the barrel wall.

5. The tool as set forth in claim 3 wherein:

the female spline member ports are downwardly slanted; and the upper end of the barrel is inwardly tapered to provide slides leading into the ports.

6. The tool as set forth in claim 3 wherein:

the upper end of the barrel comprises a pin having a thick shoulder portion and a thin threaded portion;

a seal ring is mounted in the interior surface of the shoulder portion to provide a pressure-tight seal across the narrow annular space between the mandrel and barrel pin;

a lubricant is contained in the narrow annular space; and a wiper ring is mounted in the interior surface of the threaded portion, said wiper ring being adapted to permit of the transmittal of pressure thereacross but being capable of retaining lubricant therebeneath.

7. A hydraulic tool for use in a drill string, which comprises:

telescopically arranged tubular parts comprising an outer barrel *means* and an inner mandrel received in the barrel *means* in spaced relationship therewith so that liquid-holding space is defined therebetween said barrel *means* and mandrel being movable longitudinally relative to each other between a collapsed bumping position and an extended jarring position;

packing elements sealing off the ends of the liquid holding space so that it is adapted to retain a body of operating liquid;

male spline and female spline means connecting the mandrel and barrel *means* and adapted to prevent relative rotational movement of the parts but permit of relative longitudinal movement thereof, said male spline means and the mandrel forming a first unit, said female spline means and the barrel *means* forming a second unit;

means associated with the tubular parts for operatively connecting them into a drill string;

said barrel *means* having a bumper free-stroke section of relatively large effective inside diameter, a valve-fitting section of relatively reduced inside diameter, and a jar free-stroke section of relatively large effective inside diameter, said bumper free-stroke section being of substantially greater length than the jar free-stroke section, said bumper free-stroke and jar free-stroke sections combining with the mandrel to define a bumper chamber and a jar chamber respectively;

valve means carried by at least one of the parts and comprising, when passing through the valve-fitting section, first duct means, connecting the chambers, through which operating liquid may relatively slowly pass, second duct means connecting the chambers, and means arranged to close the second duct means when the valve means is passing through the valve-fitting section toward the jar chamber, said second duct means being sized to permit operating liquid to pass from the bumper chamber to the jar chamber, as the valve means is passing through the valve-fitting section toward the bumper chamber, at a relatively rapid rate;

said bumper chamber and jar chamber being adapted, due to their relatively large effective inside diameter, to permit operating liquid to quickly bypass around the valve means when it is passing therethrough; and a pair of first impact faces, one such impact face being carried by each unit and arranged to contact each other to limit the longitudinal movement of the units relative to each other to the extended, jarring position; and a pair of second impact faces, one such second impact face being carried by each unit and arranged to contact each other to limit the longitudinal movement of the units relative to each other to the collapsed bumping position.

8. The tool as set forth in claim 7 wherein the valve means comprises:

a slide base, comprising a plurality of longitudinally extending flat areas formed on the exterior surface of the mandrel, outwardly protruding stop means at the upper end of the slide base, an annular seat at the lower end of the slide base, and a substantially cylindrical sleeve slidably mounted on the slide base between the stop means and seat, the outside surface of the sleeve combining with the inside surface of the valve-fitting section to define a passage which is the first duct means, said sleeve having a transverse opening at its stop means end and a face on the end directed toward the seat for cooperating therewith to provide liquid tight closure when the valve means is moving through the valve-fitting section toward the jar chamber, said sleeve combining with the slide base to define the second duct means, said sleeve being adapted, when drawn upwardly through the valve-fitting section, to rest on the annular seat, thereby closing the bumper chamber end of the second duct means, said sleeve, since it is axially shiftable, being adapted to be forced upwardly by fluid pressure created in the bumper chamber when the sleeve enters the upper end of the valve-fitting section, thereby opening the second duct means to allow operating liquid to bypass from the bumper chamber to the jar chamber.

9. The tool as set forth in claim 8 wherein:

the valve-fitting section has at least one longitudinal groove extending from the bumper chamber part way to the jar chamber.

10. The tool as set forth in claim 8 wherein:

the valve-fitting section is longer than the sleeve and is formed with at least one longitudinal groove extending from the bumper chamber toward the jar chamber, said groove having a length substantially equal to the length of the sleeve.

11. The tool as set forth in claim 9 wherein:

the packing element at the end of the bumper chamber is movable responsive to pressure in the drill pipe.

12. The tool as set forth in claim 9 wherein:

the packing element at the end of the bumper chamber comprises an elongate annular body carrying sealing means on its inner and outer faces adjacent each end thereof, said element being mounted on said mandrel and being adapted to be moved axially thereon in response to pressure within the drill string, said sealing rings providing a pressure tight seal between the body and the adjacent inner surfaces of the mandrel and barrel *means*.

13. The tool as set forth in claim 9 wherein:

said connecting means includes a male spline member connected to the mandrel and a female spline member connected to the barrel *means*, said male spline member being slidably received in said female spline member, said female spline member having downward slanted ports formed in its wall adjacent its connection with the barrel *means*, said barrel *means* having a tapered upper end adapted to provide a slide leading into the ports.

14. The tool as set forth in claim 13 wherein:

the annular sleeve is tapered at its upper end so that it is self-aligning on entering the valve-fitting section.

15. A hydraulic tool for use in a drill string, which comprises:

telescopically arranged tubular parts comprising outer barrel means and inner mandrel [means] received in the barrel means in spaced relationship therewith so that liquid-holding space is defined therebetween, said barrel means and mandrel [means] being movable longitudinally relative to each other between a collapsed bumping position and an extended jarring position;

upper and lower packing elements sealing off the ends of the liquid-holding space so that it is adapted to retain a body of operating liquid;

means connecting the barrel means and mandrel [means] to prevent relative rotational movement of the parts but permit of relative longitudinal movement thereof;

means at each end of the tool for threadably connecting it into the drill string;

valve means carried by the mandrel [means];

said barrel means comprising a bumper free-stroke section which, when the valve means is positioned therein, provides a passage whereby operating liquid can bypass said valve means, a valve-fitting section, and a jar free-stroke section which, when the valve means is positioned therein, provides a passageway whereby operating liquid can bypass said valve means, said bumper free-stroke section being of substantially greater length than the jar free-stroke section, said bumper free-stroke and jar free-stroke sections combining with the mandrel to define a bumper chamber and a jar chamber respectively;

said valve means comprising, when passing through the valve-fitting section, first duct means, connecting the chambers, through which operating liquid may relatively slowly pass, second duct means connecting the chambers, and means for closing the second duct means when the valve means is passing through the valve-fitting section toward the jar chamber, said second duct means being sized to permit operating liquid to pass from the bumper chamber to the jar chamber, as the valve means is passing through the valve-fitting section toward the bumper chamber, at a sufficiently rapid rate whereby the mandrel may move freely through the valve-fitting section; and impact faces, carried by the tubular parts or the connecting means, arranged to contact to limit the longitudinal movement of the parts relative to each other in either direction.

*16. A hydraulic tool for use in a drill string which comprises:*

*telescopically arranged tubular parts comprising an outer barrel means and an inner mandrel slidably received in the barrel means in spaced relationship therewith between its ends so that liquid-holding space is defined therebetween, said barrel means and mandrel being movable longitudinally relative to each other between a collapsed bumping position and an extended jarring position;*

*upper and lower packing elements sealing off the ends of the liquid-holding space so that it is adapted to retain a body of operating liquid;*

*first and second means connecting the mandrel and barrel means and preventing relative rotational movement of the parts but permitting relative longitudinal movement thereof, said first means and the mandrel forming a first unit, said second means and the barrel means forming a second unit;*

*means at each end of the tool for threadably connecting it into the drill string;*

*said barrel means having a bumper free-stroke section, a valve-fitting section, and a jar free-stroke section, said bumper free-stroke section and jar free-stroke section combining with the mandrel to form bumper and jar free-stroke chambers;*

*valve means carried by the mandrel and providing, when in the valve-fitting section,*

*first duct means, connecting the bumper free-stroke and jar free-stroke chambers, through which operating liquid may relatively slowly pass at a controlled rate so as to effect retardation of the relative movement of the tubular parts,*

*second duct means connecting the bumper free-stroke and jar free-stroke chambers,*

*and means arranged to close the second duct means when the valve means is passing through the valve-fitting section toward the jar free-stroke section,*

*said second duct means being sized to permit operating liquid to pass at a relatively rapid rate from the bumper free-stroke chamber to the jar free-stroke chamber, as the valve means is passing through the valve-fitting section toward the bumper free-stroke section;*

*said bumper free-stroke and jar free-stroke sections each forming a passage, when the valve means is passing therethrough, which permits operating liquid to relatively freely bypass around the valve means;*

*said valve-fitting section having a relatively close fit around the valve means whereby, when the valve means is passing therethrough toward the jar free-stroke section, the operating liquid is prevented from freely bypassing said valve means;*

*a pair of first impact faces, one such impact face being carried by each unit and arranged to contact the other to limit the longitudinal movement of the units relative to each other to the extended jarring position; and*

*a pair of second impact faces, one such second impact face being carried by each unit and arranged to contact the other to limit the longitudinal movement of the units relative to each other to the collapsed bumping position;*

*said impact faces and barrel sections being arranged to ensure that the effective jar stroke, being the distance moved by one tubular part relative to the other from the time the valve means leaves the valve-fitting section on the jarring stroke, thereby permitting relatively free bypass of operating liquid, until the impact faces limiting the jarring stroke contact, is substantially shorter than the effective bumping stroke, being the distance moved by one tubular part relative to the other from the time the valve means leaves the portion of the valve-fitting section, effective to cause retardation on the jarring stroke, until the impact faces limiting the bumping stroke contact.*

*17. The tool as set forth in claim 16 wherein:*

*the valve-fitting section has at least one longitudinal groove, extending from the bumper free-stroke chamber part way to the jar free-stroke chamber, for bleeding off pressure within the jar free-stroke chamber as the valve means carried by the mandrel enters the lower end of the valve-fitting section.*

*18. The tool as set forth in claim 17 wherein:*

*the packing element at the lower end of the bumper section is slidably mounted on the mandrel and comprises*

*an elongate annular body,*

*sealing rings mounted on the body's inner and outer faces adjacent each end thereof,*

*said sealing rings providing a pressure tight seal between the body and the adjacent surfaces of the mandrel and barrel.*

*19. The tool as set forth in claim 18 wherein the valve means comprises:*

*a slide base, comprising a plurality of longitudinally extending flat areas formed on the exterior surface of the mandrel,*

*outwardly protruding stop means at the upper end of the slide base,*

*an annular seat at the lower end of the slide base, and*

*a substantially cylindrical sleeve slidably mounted on the slide base between the stop means and seat,*

*said sleeve having a transverse opening at its stop means end and a face on the end directed toward the seat for cooperating therewith to provide liquid tight*

*closure when the valve means is moving through the valve-fitting section toward the jar chamber,*

*said sleeve combining with the slide base to define the second duct means,*

*said sleeve being adapted, when drawn upwardly through the valve-fitting section, to rest on the annular seat, thereby closing the bumper chamber end of the second duct means, said sleeve, since it is axially shiftable, being adapted to be forced upwardly when the sleeve enters the upper end of the valve-fitting section, thereby opening the second duct means to allow operating liquid to by-pass from the bumper chamber to the jar chamber.*

*20. A hydraulic tool for use in a drill string which comprises:*

*telescopically arranged tubular parts comprising an outer barrel means and an inner mandrel slidably received in the barrel means in spaced relationship therewith between its ends so that liquid-holding space is defined therebetween, said barrel means and mandrel being movable longitudinally relative to each other between a collapsed bumping position and an extended jarring position;*

*upper and lower packing elements sealing off the ends of the liquid-holding space so that it is adapted to retain a body of operating liquid;*

*first and second means connecting the mandrel and barrel means and preventing relative rotational movement of the parts but permitting relative longitudinal movement thereof, said first means and the mandrel forming a first unit, said second means and the barrel means forming a second unit;*

*means at each end of the tool for threadably connecting it into the drill string;*

*said barrel means having a jar free-stroke section and a bumper free-stroke section,*

*said sections cooperating with the mandrel to form longitudinally spaced jar free-stroke and bumper free-stroke passages for relatively rapid movement therethrough of operating liquid;*

*said barrel means having a first section between the passage-forming sections thereof;*

*a valve mechanism, portions of which are carried by each of the mandrel and first section, for forming, when the mandrel portion of the valve mechanism is positioned in the first section,*

*first duct means connecting the passages through which operating liquid can relatively slowly pass at a controlled rate so as to effect retardation of the relative movement of the tubular parts;*

*second duct means connecting the passages,*

*and means arranged to close the second duct means when the mandrel portion of the valve mechanism is passing through the first section toward the jar free-stroke passage,*

*said second duct means being sized to permit operating liquid to pass at a relatively rapid rate from the bumper free-stroke passage to the jar free-stroke passage, as the mandrel valve means portion is passing through the first section toward the bumper free-stroke passage;*

*a pair of first impact faces, one such impact face being carried by each unit and arranged to contact the other to limit the longitudinal movement of the units relative to each other to the extended jarring position;*

*a pair of second impact faces, one such second impact face being carried by each unit and arranged to contact the other to limit the longitudinal movement of the units relative to each other to the collapsed bumping position;*

*said impact faces and barrel sections being arranged to ensure that the effective jar stroke, being the distance moved by one tubular part relative to the other from the time the mandrel portion of the valve mechanism leaves the first section on the jarring stroke, thereby permitting relatively free bypass of operating liquid, until the impact faces limiting the jarring stroke contact, is substantially shorter than the effective bumping stroke, being the distance moved by one tubular part relative to the other from the time the mandrel portion of the valve mechanism leaves the portion of the first section, effective to cause retardation on the jarring stroke, until the impact faces limiting the bumping stroke contact.*

*21. The tool as set forth in claim 20 wherein:*

*the first section has at least one longitudinal groove, extending from the bumper free-stroke section part way to the jar free-stroke section, for bleeding off pressure within the jar free-stroke passage as the valve means carried by the mandrel enters the lower end of the first section.*

*22. The tool as set forth in claim 21 wherein:*

*the packing element at the lower end of the bumper free-stroke section is slidably mounted on the mandrel and comprises*

*an elongate annular body,*

*sealing rings mounted on the body's inner and outer faces adjacent each end thereof,*

*said sealing rings providing a pressure tight seal between the body and the adjacent surfaces of the mandrel and barrel means.*

*23. The tool as set forth in claim 22 wherein the valve means comprises:*

*a slide base, comprising a plurality of longitudinally extending flat areas formed on the exterior surface of the mandrel,*

*outwardly protruding stop means at the upper end of the slide base,*

*an annular seat at the lower end of the slide base, and*

*a substantially cylindrical sleeve slidably mounted on the slide base between the stop means and seat,*

*said sleeve having a transverse opening at its stop means end and a face on the end directed toward the seat for cooperating therewith to provide liquid tight closure when the valve means is moving through the first section toward the jar free-stroke section,*

*said sleeve combining with the slide base to define the second duct means,*

*said sleeve being adapted, when drawn upwardly through the first section, to rest on the annular seat, thereby closing the bumper free-stroke section end of the second duct means, said sleeve, since it is axially shiftable, being adapted to be forced upwardly when the sleeve enters the upper end of the first section, thereby opening the second duct means to allow operating liquid to by-pass from the bumper free-stroke passage to the jar free-stroke passage.*

* * * * *